Patented Aug. 10, 1926.

1,595,911

UNITED STATES PATENT OFFICE.

DONALD MOIR AND HUGH BUCHANAN, OF ROSARIO DE SANTA FE, ARGENTINA.

MEANS FOR THE MANUFACTURE, CENTRIFUGALLY, OF PIPES, COLUMNS, AND OTHER ARTICLES.

Application filed November 28, 1925, Serial No. 71,946, and in Germany September 2, 1925.

The object of the present invention is to provide improved means whereby hollow articles may be manufactured or lined with plastic material under the action of centrifugal force due to rolling from one position to another of the mould or article in question.

The free rolling of a mould or pipe along a rail track possesses many advantages over other methods wherein rotation about a stationary axis takes place, but provision has to be made to ensure proper travel along the track, and this, in accordance with the present invention, is achieved by employing speed compensating members coaxial with the mould, pipe or other article, such compensating members comprising journals of varying cross sectional dimensions arranged to act in opposition, as hereinafter described.

Figure 1:
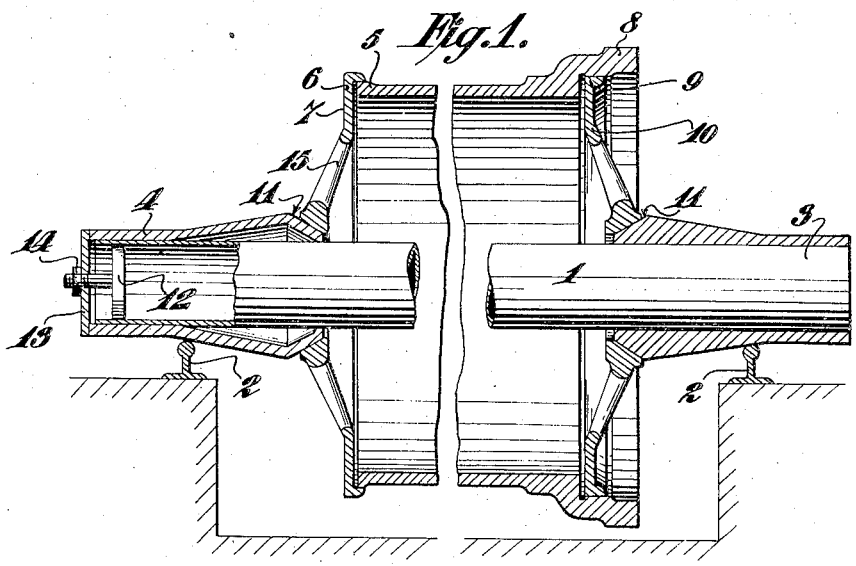
Figure 2:
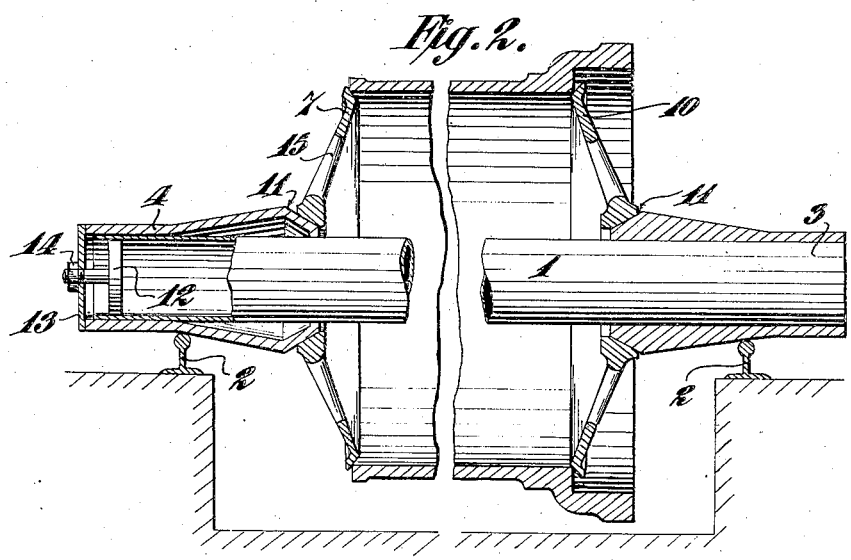
Figure 3:
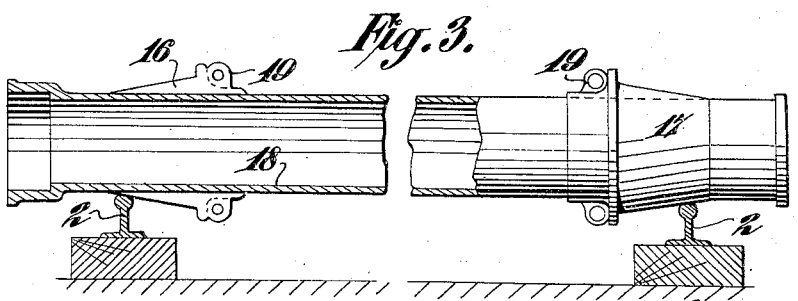

But in order that the invention may be more readily understood three ways of carrying the same into effect are illustrated in the accompanying drawings, Figs. 1, 2 and 3 being each a similar longitudinal section of one embodiment, it being understood that in every instance parts have been broken away at the centre.

The arrangement shown in Fig. 1 is particularly applicable to pipes having turned and bored spigots and sockets intended to be lined with cement and of relatively great diameter that is to say large enough to permit of the passage therethrough of a support 1 such as a thick Mannesmann tube. The track upon which rolling is to take place is represented by the two rails 2, a sleeve 3 firmly attached to one end of the tube 1 being arranged to bear upon one rail whilst a similar sleeve 4 which is a sliding fit on the other end of the tube 1, and hence removable, is arranged to bear upon the other rail 2. These sleeves 3, 4 may be of the sectional shape shown in the drawing although not so restricted, as other forms are employable which will have the effect of correcting tendency of one end of the tube 1 to advance at the expense of the other. The machined spigot end 5 of the pipe to be lined fits the flanged portion 6 of an end disc 7 whilst the machined socket 8 of the pipe 1 is borne by the portion 9 of a second end disc 10. Both discs 7, 10 are bored centrally, somewhat larger than the external diameter of the tube 1 so that the latter can be easily withdrawn, and each is bored to suit conical and equivalently tapered seatings 11 upon the sleeves 3, 4. To the interior of the tube 1 is firmly secured a stud 12 upon which is fitted an end washer 13 and a nut 14.

In preparing a pipe for treatment, the end discs 7, 10 are first placed in position therein, and the tube 1, from which has been removed the end washer 13 and sleeve 4 is inserted through the holes in the discs. The sleeve 4 is next slipped on and later the end washer 13.

It will now be seen that by the simple operation of tightening the nut 14 the whole combination is firmly held together and at the same time the pipe is accurately centred about the tube 1 by means of the tapered seatings 11. The apparatus is next placed upon the track rails 2 and the required quantity of mixture is introduced through holes 15 provided for the purpose in the end discs 7, 10.

Rolling is now allowed to take place and any tendency which may develop for the pipe to become derailed is arrested by the taper of the sleeves 3, 4.

Upon arriving at the end of the track the nut 14, end washer 13 and loose sleeve 4 are removed from the tube 1 and the latter is then withdrawn from the end discs 7, 10. When the end discs 7, 10 are ultimately removed all the component parts of the apparatus are available for use upon another pipe.

Fig. 2 illustrates a modification more particularly for use where pipes are to be dealt with which have no turned and bored spigot and socket. The arrangement is essentially the same as that already described except that the end discs 7, 10 are alike and both adapted to engage internal circular edges of the pipe, as clearly illustrated.

Fig. 3 shows how smaller pipes may be dealt with, 16, 17 being halves of two conical split sleeves adapted to be clamped upon a pipe 18, as by bolts passed through lugs 19 upon the sleeve parts. The sleeve in this instance may be arranged so that normally the pipe 18 rolls upon its own circumference, only coming into play when correction in the travel is necessary.

What we claim is:—

1. Means of the kind herein referred to comprising a double rail track a rotary member adapted to roll there along means adapted to support a pipe upon the rotary member and conical speed compensating journals arranged coaxially with the rotary member and adapted to engage the rails, substantially as described.

2. Means of the kind herein referred to, comprising a support, discs adapted to hold a pipe concentrically thereon, journals having tapered track engaging surfaces and tapered seatings for the end discs, and means for producing relative axial movement between the journals to tighten up and loosen the parts, substantially as described.

3. Means of the kind herein referred to, comprising a tubular support, a journal fixed thereto having a tapered track-engaging surface and a tapered seating, a disc adapted to engage said seating and to enter one end of the pipe, a second disc adapted to engage the opposite end of the pipe, an axially movable journal similar to the first named journal associated with the second disc and means for holding the latter in various positions, substantially as described.

Signed at Rosario de Santa Fe Argentine Republic this twenty-fourth day of October 1925.

DONALD MOIR.
HUGH BUCHANAN.